(12) United States Patent
Wang

(10) Patent No.: US 6,782,279 B2
(45) Date of Patent: Aug. 24, 2004

(54) METHOD FOR SIMPLIFYING CELLULAR PHONE MENU SELECTION

(75) Inventor: Shun-Ping Wang, Taipei Hsieng (TW)

(73) Assignee: Inventec Appliances Corp., Taipei Hsieng (TW)

( * ) Notice: Subject to any disclaimer, the term of this patent is extended or adjusted under 35 U.S.C. 154(b) by 420 days.

(21) Appl. No.: 09/912,510

(22) Filed: Jul. 26, 2001

(65) Prior Publication Data

US 2003/0022700 A1 Jan. 30, 2003

(51) Int. Cl.$^7$ .................................................. H04Q 7/32
(52) U.S. Cl. ................ 455/566; 455/550.1; 455/412.1; 455/412.2; 345/864; 345/866
(58) Field of Search ................................. 455/418, 419, 455/420, 566, 550.1, 403, 517, 412.1, 412.2, 422.1, 556.1, 556.2; 345/619, 620, 637, 684, 686, 788, 789, 781, 780, 864, 866; 379/428.03, 433.04, 433.06

(56) References Cited

U.S. PATENT DOCUMENTS 6,263,217 B1 * 7/2001 Park ........................ 455/566

2001/0014600 A1 * 8/2001 Osman ...................... 455/566

* cited by examiner

Primary Examiner—William Trost
Assistant Examiner—Keith Ferguson
(74) Attorney, Agent, or Firm—Bacon & Thomas, PLLC

(57) ABSTRACT

A method for simplifying a menu selection on a cellular phone, wherein an operating system installed in the cellular phone proceeds with a process comprising the steps of: (a) reading a memory of the cellular phone while the cellular phone is turned on; (b) determining whether a topmost sub-menu set instruction with respect to a most frequently used one of a plurality of sub-menus already being set and stored in the memory; (c) if yes, showing the most frequently used sub-menu on a topmost position of a main menu as a topmost sub-menu on a display of the cellular phone. This can simplify the selection of menu and sub-menus thereof, thereby eliminating conventional drawbacks of tedious and time consuming in reaching a desired sub-menu stepwise.

3 Claims, 2 Drawing Sheets

METHOD FOR SIMPLIFYING CELLULAR PHONE MENU SELECTION

FIELD OF THE INVENTION

The present invention relates to cellular phones and more particularly to a method for simplifying cellular phone menu selection for ease of operation.

BACKGROUND OF THE INVENTION

Cellular phones have been widely used through out the world. Further, there is no end for such booming because among other advantageous benefits as compared to conventional wire telephone, cellular phone is slim, multifunctional, inexpensive, portable, and convenient while still maintaining a high communication quality. Hence, more and more people like to use cellular phones whether for business or social purpose. But there are some drawbacks associated with cellular phone despite its advantages over conventional wire telephone in certain fields. For example, there are many menus available on cellular phone. Hence, it is typical for user to select options of menu and sub-menu many times before reaching the final desired one in a sub-menu. This means that a user has to press a selection confirmation button associated with respective menu/sub-menu many times. In a typical example of searching first five called phone numbers in phone book, user may press a main menu to select a phone book option thereof. Then press a selection confirmation button. Accordingly, first five called phone numbers are shown on display. Hence, user may move any direction key on cellular phone to search each one of the first five called phone numbers and dial the same directly if a desired one is found. However, if the desired one is not found, user has to return to the main menu from the current sub-menu step by step before performing a different search again. In view of above, it is tedious. Moreover, display of cellular phone is small and number of keys is only a few. Hence, above search technique is bothersome. To the worse, it is annoying to select a desired one of options available on a sub-menu since it may change as time and/or position. Hence, it is a time consuming job to manipulate such sub-menus by cellular phone user. Thus, there is a need to provide a cellular phone incorporating a feature to enable user to utilize a selection method for simplifying a search of cellular phone menu and sub-menus thereof in order to overcome the above drawbacks of prior art.

SUMMARY OF THE INVENTION

It is therefore an object of the present invention to provide a method for simplifying a menu selection on a cellular phone, wherein an operating system installed in the cellular phone proceeds with a process comprising the steps of (a) reading a memory of the cellular phone while the cellular phone is turned on; (b) determining whether a topmost sub-menu set instruction with respect to a most frequently used one of a plurality of sub-menus already being set and stored in the memory; (c) if yes, showing the most frequently used sub-menu on a topmost position of a main menu as a topmost sub-menu on a display of the cellular phone. This can simplify the selection of cellular phone menu and sub-menus thereof. Further, drawbacks experienced in prior art such as tedious and time consuming in reaching a desired sub-menu in a stepwise manner are eliminated.

The above and other objects, features and advantages of the present invention will become apparent from the following detailed description taken with the accompanying drawings.

DETAILED DESCRIPTION OF THE PREFERRED EMBODIMENTS

Figure 1:
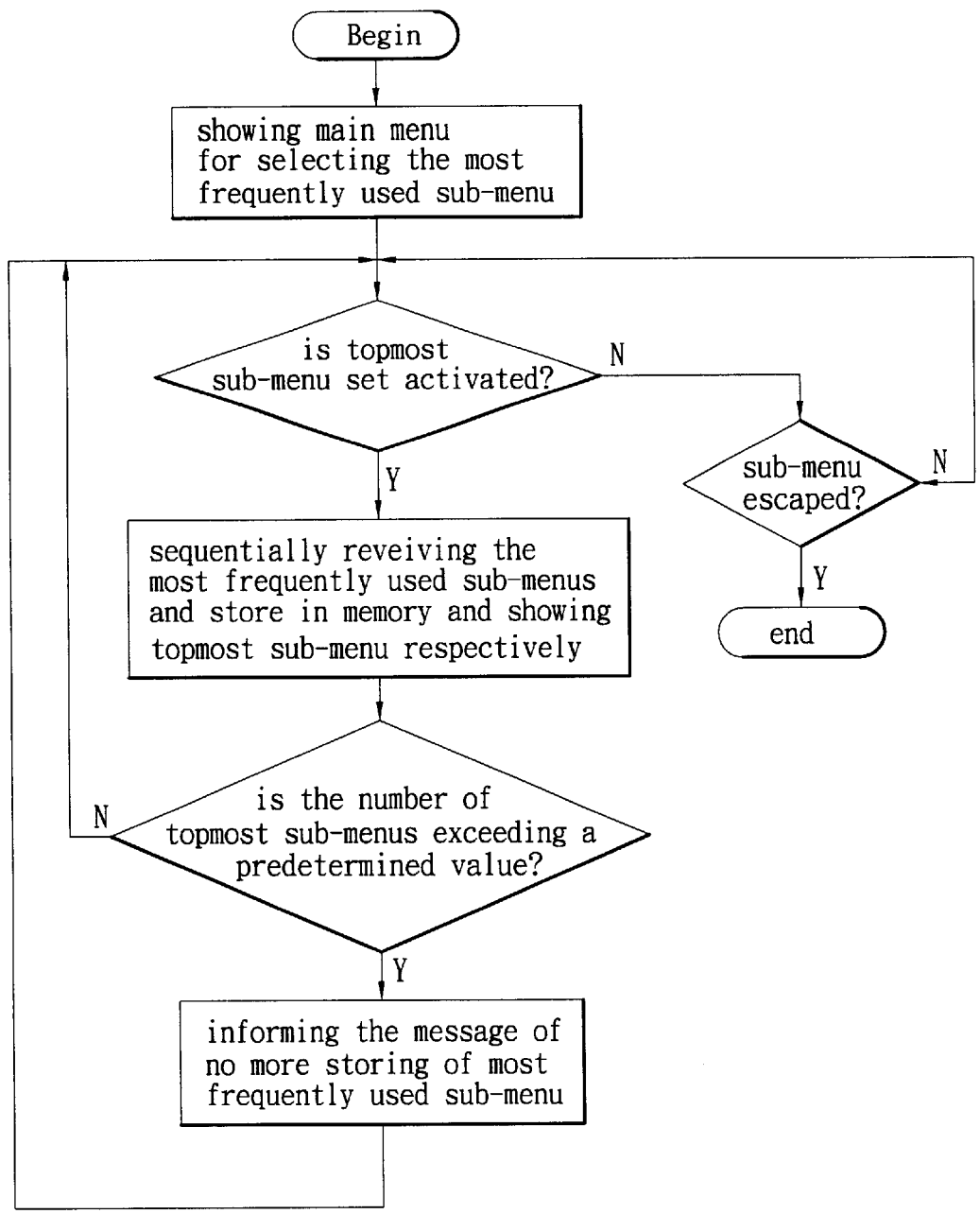
FIG. 1 is a flow chart illustrating a selection process for simplifying a search of cellular phone menu and sub-menus thereof according to the invention.
Figure 2:
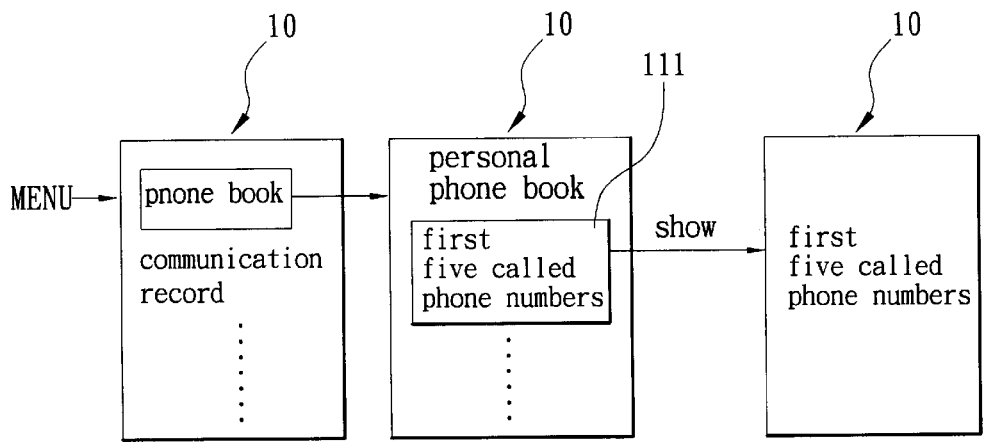
FIG. 2 schematically shows a series of user selection operations for establishing a topmost sub-menu according to the invention.
Figure 3:
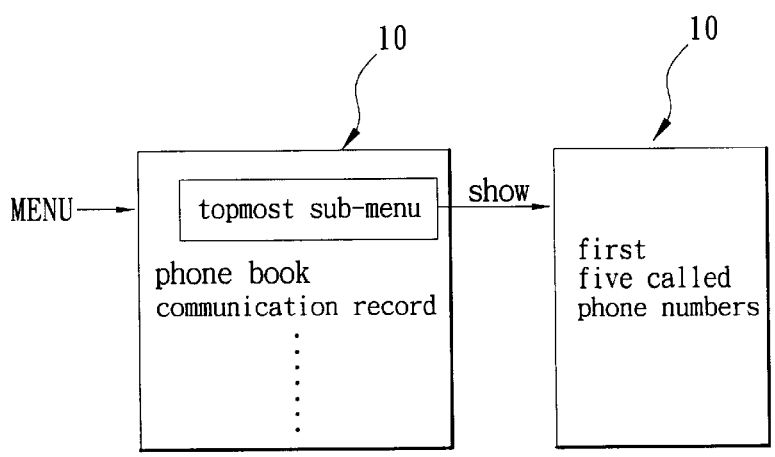
FIG. 3 schematically shows the established topmost sub-menu for illustrating the simplification effect achieved by the invention.

Referring to FIGS. 1 to 3, there is shown a method for simplifying cellular phone menu selection in accordance with the invention. This method is designed for simplifying a menu selection on a cellular phone, wherein an operating system installed in the cellular phone is activated while it is turned on. The operating system then reads data stored in a memory of the cellular phone to determine whether a topmost sub-menu set instruction has already been set and stored in the memory.

If the topmost sub-menu set instruction hasn't been set yet, the operating system reads a menu (i.e., main menu) from the memory and shows the menu on a display of the cellular phone enabling a user to select a desired sub-menu from the menu through pressing selection the operating system buttons associated with respective menu/sub-menu step by step. At the time the display shows thereon the desired sub-menu, such as a phone book, as shown in FIG. 2, user may press a selection confirmation button to select a sub-menu of a first five called phone numbers under the sub-menu of phone book to searching recent first five called phone numbers in the phone book. Accordingly, first five called phone numbers are shown on display. Hence, user may move any direction key on cellular phone to search each one of the first five called phone numbers and dial the same directly if a desired one is found.

In one preferred embodiment of the invention, if user wants to set his most frequently used one of a plurality of sub-menus, he can input a topmost sub-menu set instruction via a function key of the cellular phone (or a function key on the menu/sub-menu) to set the sub-menu shown on the display as his most frequently used one of a plurality of sub-menus if the desired one is found. At this moment, the operating system receives the topmost sub-menu set instruction and stores it in the memory, and then shows the most frequently used sub-menu as a topmost sub-menu on the topmost position of the main menu. As a result, the method of the invention can simplify the menu selection steps in reaching a desired sub-menu.

FIG. 1 is a flow chart illustrating a selection process for simplifying a search of cellular phone menu and sub-menus thereof according to the invention. Firstly, turn on cellular phone, the operating system installed therein proceeds with a process comprising the following steps:

Step 1: reading the memory of the cellular phone;

Step 2: determining whether a topmost sub-menu set instruction with respect to a most frequently used one of a plurality of sub-menus already being set and stored in the memory;

Step 3: if yes, showing the most frequently used sub-menu on a topmost position of the main menu on the display of cellular phone as a topmost sub-menu; If not, reading the main menu from the memory and showing the main menu on the display of the cellular phone accordingly.

In another preferred embodiment of the invention, the operating system permits the user to input a plurality of the topmost sub-menu set instructions. When the operating system sequentially receiving a plurality of the most frequently used sub-menus selected by user, the operating system stores the selected sub-menus in the memory respectively. The operating system also has the ability to determine whether the number of the selected topmost sub-menus exceeds a predetermined value (e.g., ten). If the operating system determines that the number of the selected topmost sub-menus exceeding a predetermined value, it will prompt a message on the display to inform user that it is impossible to store any selected most frequently used sub-menu as the topmost sub-menu and end up the process.

FIG. 3 schematically shows the established topmost sub-menu added into main menu shown on the display 10. Hence, user may enter a topmost sub-menu directly. Then the operating system shows first five called phone numbers 111 on the display 10. As such, user may perform a further processing. In brief, this can simplify the selection of cellular phone menu and sub-menus thereof. Further, drawbacks experienced in prior art such as tedious and time consuming in reaching a desired sub-menu in a stepwise manner are eliminated. As a result, a convenient practical while multifunctional cellular phone menu is carried out.

While the invention has been described by means of specific embodiments, numerous modifications and variations could be made thereto by those skilled in the art without departing from the scope and spirit of the invention set forth in the claims.

What is claimed is:

1. A method for simplifying a menu selection on a cellular phone, wherein an operating system installed in said cellular phone proceeds with a process comprising the steps of:

(a) reading a memory of the cellular phone while said cellular phone is turned on;

(b) determining whether a topmost sub-menu set instruction with respect to a most frequently used one of a plurality of sub-menus is already set and stored in said memory;

(c) if yes, indicating at a topmost position in a main menu of a display of said cellular telephone that said most frequently used sub-menu is a topmost sub-menu, so that the most frequently used sub-menu can be selected directly from a topmost position of the main menu, wherein said topmost sub-menu set instruction is set by a user via a function key of said cellular phone when a sub-menu shown on said display is desired to be said most frequently used one of a plurality sub-menus.

2. The method of claim 1, wherein when a user selects a plurality of most frequently used sub-menus via said function key, so that said operating system sequentially receives a plurality of most frequently used sub-menus being selected, said operating system stores said most frequently used sub-menus in said memory respectively and determines whether the number of said top most sub-menus exceeds a predetermined value.

3. The method of claim 2, wherein when the operating system determines that the number of the topmost sub-menus exceeds a predetermined value, the operating system will prompt a message on the display to inform the user that it is impossible to store any additional said most frequently used sub-menu.

* * * * *